United States Patent
Andersson et al.

(10) Patent No.: US 8,322,136 B2
(45) Date of Patent: Dec. 4, 2012

(54) METHOD FOR OPERATING A TURBO CHARGER AND CONTROLLER

(75) Inventors: Per Andersson, Lidköping (SE); Erik Jansson, Järna (SE)

(73) Assignee: GM Global Technology Operations LLC, Detroit, MI (US)

(*) Notice: Subject to any disclaimer, the term of this patent is extended or adjusted under 35 U.S.C. 154(b) by 102 days.

(21) Appl. No.: 12/876,959

(22) Filed: Sep. 7, 2010

(65) Prior Publication Data
US 2011/0126810 A1    Jun. 2, 2011

(30) Foreign Application Priority Data

Sep. 8, 2009  (GB) .................................. 0915646.4

(51) Int. Cl.
F02D 23/00 (2006.01)
B64C 13/04 (2006.01)

(52) U.S. Cl. .......................... 60/602; 244/221
(58) Field of Classification Search .............. 60/602; 701/101; 73/118.2; 244/221
See application file for complete search history.

(56) References Cited

U.S. PATENT DOCUMENTS

| | | | |
|---|---|---|---|
| 4,805,574 A * | 2/1989 | Sakamoto et al. | 123/406.55 |
| 5,191,789 A | 3/1993 | Furuya | 73/118.2 |
| 5,224,853 A * | 7/1993 | Kazuo et al. | 60/602 |
| 5,585,553 A * | 12/1996 | Schricker | 73/114.37 |
| 5,597,951 A * | 1/1997 | Yoshizaki et al. | 73/114.32 |
| 6,224,021 B1 * | 5/2001 | Tanaka | 244/221 |
| 6,588,261 B1 * | 7/2003 | Wild et al. | 701/101 |
| 6,637,202 B2 * | 10/2003 | Koch et al. | 60/602 |
| 6,698,203 B2 * | 3/2004 | Wang | 60/602 |
| 7,047,740 B2 * | 5/2006 | Fukasawa et al. | 60/602 |
| 7,281,531 B1 * | 10/2007 | Fulton et al. | 123/568.17 |
| 7,748,366 B2 * | 7/2010 | Rollinger et al. | 123/564 |
| 2002/0166322 A1 | 11/2002 | Weinreuter | 60/602 |

FOREIGN PATENT DOCUMENTS

WO       0216739 A2    2/2002

OTHER PUBLICATIONS

Great Britain Search Report, dated Dec. 15, 2009 for Application No. GB0915646.4.

* cited by examiner

*Primary Examiner* — Thai Ba Trieu
(74) *Attorney, Agent, or Firm* — Ingrassia Fisher & Lorenz, P.C.

(57) ABSTRACT

A method is provided for operating a turbo charger of a combustion engine that includes, but is not limited to providing a set of values of a basic boost pressure for opening a waste gate for the turbo charger at a standard Temperature and at a standard pressure and measuring an ambient air temperature and an ambient air pressure. The method also includes, but is not limited to calculating a density of ambient air based on a mathematical formula using the measured ambient air temperature and the measured ambient air pressure and transforming at least one point of the provided set of values of the basic boost pressure at standard conditions into at least one point of an estimated set of values of the basic boost pressure at ambient conditions by a correction factor based on the calculated density, and controlling the turbo charger with least one corrected value of the basic boost pressure.

15 Claims, 3 Drawing Sheets

METHOD FOR OPERATING A TURBO CHARGER AND CONTROLLER

CROSS-REFERENCE TO RELATED APPLICATION

This application claims priority to British Patent Application No. 0915646.4, filed Sep. 8, 2009, which is incorporated herein by reference in its entirety.

TECHNICAL FIELD

The invention relates to a method for operating a turbo charger for a combustion engine of a vehicle as well as a controller for controlling such kind of a turbo charger.

BACKGROUND

A turbo charger comprises a turbine connected to a compressor. By means of the compressor ambient air is sucked in, compressed to a higher pressure and fed to an engine. Exhaust gas of the engine is led to the turbine, where the exhaust gas is expanded for driving the compressor. For controlling the pressure of the sucked in ambient air a bypass for bypassing the turbine is provided, so that the turbine can be operated by a reduced exhaust gas flow. The bypass is opened and closed by a so called waste gate. The waste gate can be actuated by the pressure of a duty cycle, for instance by means of the ambient air pressure after the compressor. The waste gate is spring loaded in closing direction. Due to the spring force a minimum boost pressure is necessary for opening the waste gate, wherein this minimum boost pressure is named "basic boost pressure". Turbocharger boost pressure control can only be performed above the basic boost pressure, since only above the basic boost pressure the opening and the closing of the waste gate can be controlled. Since the basic boost pressure limits the possibilities of the control, the basic boost pressure is an important factor for providing a good control of the turbo charger. For that reason it is important to know the basic boost pressure with a high accuracy. But the basic boost pressure depends on ambient air conditions, which can not be calculated in advance.

It is known to provide a table of a set of values of the basic boost pressure at standard conditions and to provide further tables for correcting the provided basic boost pressure values to ambient conditions. For that reason a further table for providing a correction factor based on an ambient air temperature T and a further table for providing a correction factor based on an ambient air pressure p are provided.

It is a disadvantage of such kind of a control method that these tables have to be derived by a calibration by means of a plurality of experiments at different ambient air temperatures and different ambient air pressures, which requires a high effort leading to high costs.

It is at least one object of the invention to provide a method of operating a turbo charger as well as a controller, by which it is possible to control the turbo charger on the basis of a basic boost pressure, which is received with high accuracy in a simplified manner. Furthermore, other objects, desirable features, and characteristics will become apparent from the subsequent summary and detailed description, and the appended claims, taken in conjunction with the accompanying drawings and this background.

SUMMARY

The solution of the object is achieved by a method as well as by a controller. The method according to an embodiment of the invention for operating a turbo charger for a combustion engine, comprises the step of providing a set of values of a basic boost pressure, which is required for opening a waste gate for the turbo charger, being derived at standard conditions comprising a standard Temperature $T_0$ and at a standard pressure $p_0$. An ambient air temperature T is measured. An ambient air pressure p is measured. It is calculated a density $\rho$ of ambient air based on a mathematical formula using the measured ambient air temperature T and the measured ambient air pressure p. At least one point of the provided set of values of the basic boost pressure at standard conditions is transformed into at least one point of an estimated set of values of the basic boost pressure at ambient conditions by a correction factor based on the calculated density $\rho$. At least one estimated value of the basic boost pressure is used for controlling the turbo charger.

Due to the mathematical determination of the basic boost pressure correction tables, which have to be derived by time-consuming calibrations, can be omitted, so that it is possible to control the turbo charger on the basis of a basic boost pressure, which is received with high accuracy in a simplified manner. The set of values for the basic boost pressure at standard conditions can be elaborated once. Further it is possible to use mainly any standard conditions. The standard basic boost set of values can be measured at nearly every mainly constant ambient air temperature and ambient air pressure, since every difference to the standard conditions can be calculated in a fast and easy manner with high accuracy. The set of values of the basic boost at standard conditions can be provided as a table comprising a plurality of key points, between them additional values can be interpolated. In the case that the whole or a significant part of the set of values of the basic boost pressure at standard conditions is transformed, the results may be also provided by a table. It is used the insight that by using the density as sole disturbance variable the influences of the ambient air temperature and the ambient air pressure at the same time can be considered. In addition the density is not directly measured but calculated by a suitable mathematical formula. A complicated measuring device for measuring the density of the ambient air is not necessary. Easily to perform temperature and pressure measurements are sufficient. Particularly it was observed, that a simple formula like the ideal gas law is sufficient for determining the density of the ambient air and calculating the basic boost pressure with a surprising high accuracy although the ideal gas law is mainly only applicable at low pressures and high temperatures. Since only a low calculation power and a reduced storing memory is sufficient, the control of the turbo charger can be performed by a simpler and cheaper calculation unit and/or additional data can be stored for improving the control further.

Particularly, only one set of values of the basic boost pressure at standard conditions for each gear is provided. Different conditions for the turbo charger at different gears can be considered. Since only one of theses sets of values is required, the effort for managing the different sets of values is not significantly increased.

Preferably, only one set of values of the basic boost pressure at standard conditions for all forward gears is provided. More preferred only one set of values of the basic boost pressure at standard conditions for all gears is provided. The memory and managing effort of a used controller can be minimized.

Particularly, the provided set of values of the basic boost pressure at standard conditions is given for different engine speeds. Since the basic boost pressure depends on the engine speed partially in a non-linear manner a measured set of values of the basic boost pressure in dependency of the engine speed is very valid information for determining the actual applicable estimated basic boost pressure.

Preferably, the mathematical formula for calculating the density ρ is derived from a mathematically described gas law. A scientifically based formula leads to very accurate results for calculating an unknown basic boost pressure. Particularly the basic boost pressure is derived from the ideal gas law and/or the van der Waals equation and/or the Redlich-Kwong-Soave equation. Particularly the way of calculating the actual basic boost pressure can be changed. At comparatively low pressure and high temperature the ideal gas law can be used, wherein at higher pressures the van der Waals equation and/or the Redlich-Kwong-Soave equation can be used. The parameters of the van der Waals equation and/or the Redlich-Kwong-Soave equation are mainly constant for ambient air and can be stored as constants.

It is possible to perform the step of calculating the density ρ and the step of transforming the provided set of values of the basic boost pressure subsequently. In this case one correction parameter is calculated, which can be relevant for additional controls of the combustion engine. In a preferred embodiment the step of calculating the density ρ and the step of transforming the provided set of values of the basic boost pressure is performed mainly at the same time by using correction factors, which are part of the used mathematical formula. It is not necessary to calculate the density ρ as a particular value. When using the ideal gas law for calculating the actual basic boost pressure it is possible to multiply the value of the basic boost pressure at standard conditions particularly at a specific engine speed by $p/p_0$ and $T_0/T$. The multiplication of these two ratios corresponds to the ratio of the densities at ambient conditions and standard conditions $\rho/\rho_0$.

The embodiments of the invention further relates to a controller for controlling a turbo charger for a combustion engine, wherein the controller is particularly adapted for carrying out the method as previously described. The controller comprises a memory comprising a stored set of values of a basic boost pressure, which is required for opening a waste gate for the turbo charger, being derived at standard conditions comprising a standard temperature $T_0$ and at a standard pressure $p_0$, a data input for receiving a measured ambient air temperature T and a measured ambient air pressure p, a calculating unit for calculating a density ρ of ambient air based on an mathematical formula using the measured ambient air temperature T and the measured ambient air pressure p, and for transforming at least one point of the provided set of values of the basic boost pressure at standard conditions into at least one point of an estimated set of values of the basic boost pressure at ambient air conditions by a correction factor based on the calculated density ρ, and a control element for operating the waste gate based on at least one estimated value of the basic boost pressure. Due to the mathematical determination of the basic boost pressure correction tables, which have to be derived by time-consuming calibrations, can be omitted, so that it is possible to control the turbo charger on the basis of a basic boost pressure, which is received with high accuracy in a simplified manner. The controller can be further designed as previously described with respect to the method according to embodiments of the invention.

Particularly, a temperature sensor for measuring the ambient air temperature T and a pressure sensor for measuring the ambient air pressure p are connected to the data input. Particularly by means of a direct connection of the sensors to the data input the controller can very fast consider changed ambient conditions leading to an increased control performance.

The embodiments of the invention further relates to a turbo charger for a combustion engine. The turbo charger comprises a turbine connected to a compressor, a waste gate for bypassing the turbine and a controller for controlling the waste gate, wherein the controller can be designed as previously described. Due to the mathematical determination of the basic boost correction tables, which have to be derived by time-consuming calibrations, can be omitted, so that it is possible to control the turbo charger on the basis of a basic boost pressure, which is received with high accuracy in a simplified manner.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
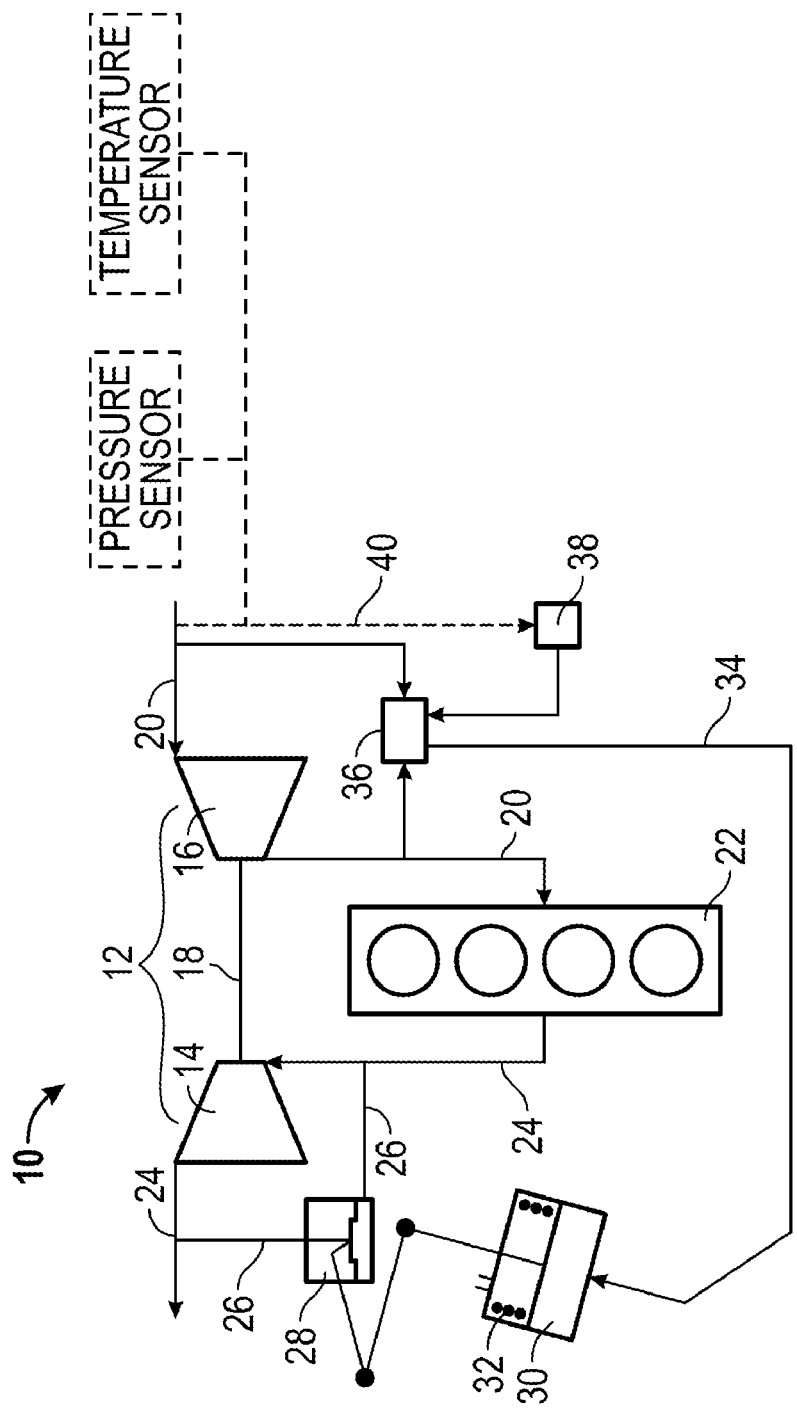
FIG. 1 is a schematic conceptual drawing of a combustion engine.

The combustion engine 10 as illustrated in FIG. 1 comprises a turbo charger 12. The turbo charger 12 comprises a turbine 14 driving a compressor 16 via a shaft 18. Via an intake channel 20 ambient air is compressed by the compressor 16 and led to an engine 22. Via an exhaust channel 24 exhaust gases from the engine 22 can be led through the turbine 14. A part of the exhaust gas can be bypassed the turbine 14 via a bypass 26. The bypass 26 can be opened and closed by a waste gate 28, which is operated by a waste gate actuator 30. The waste gate actuator 30 is spring loaded in closing direction of the waste gate 28 by means of a spring 32. For opening the waste gate 28 the spring force of the spring 32 has to be overcome. To the waste gate actuator 30 a pressure is applied via a boost line 34. The boost line 34 is pressurized from the intake channel 20 via a boost valve 36. The boost valve 36 is a control element for operating the waste gate 28. For controlling the turbo charger 12 the boost valve 36 is controlled by a controller 38. The controller 38 receives data via a data line 40 about the ambient air pressure and the ambient air temperature of the ambient air. By means of the received data the controller 38 corrects by means of a mathematical formula a stored set of values of a basic boost pressure, which is required for opening the waste gate 28, at specific standard conditions.

Figure 2:
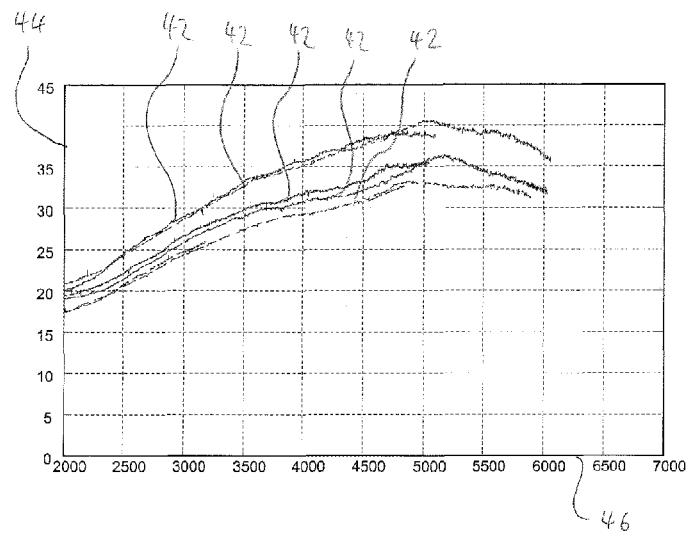
FIG. 2 is a schematic diagram of measured basic boost pressures.
Figure 3:
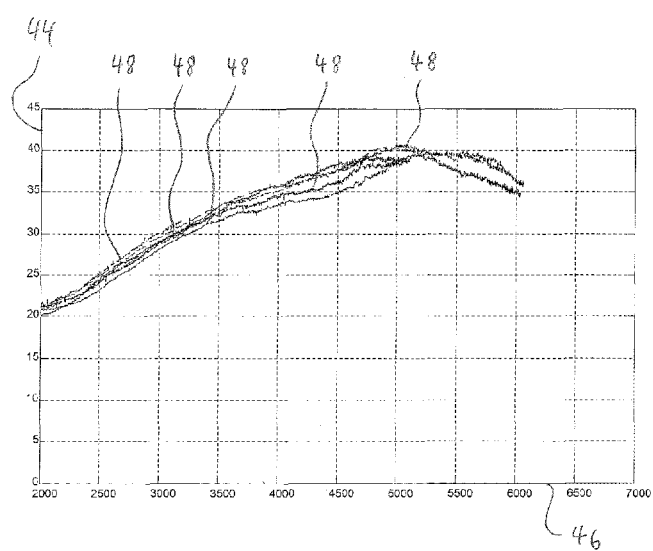
FIG. 3 is a schematic diagram of corrected basic boost pressures of FIG. 2.
Figure 4:
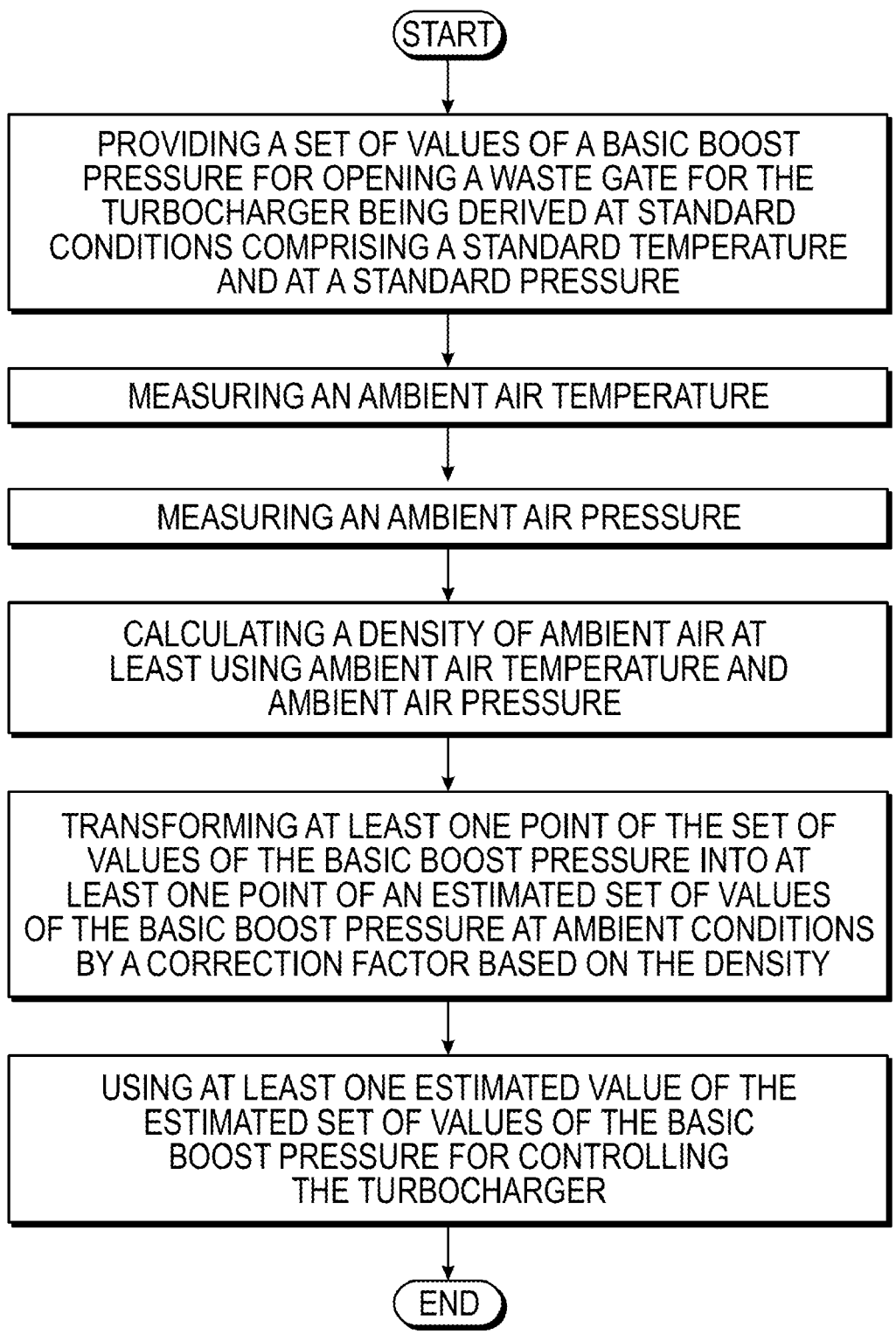
FIG. 4 is a schematic diagram of a method for operating a turbocharger.

In FIG. 2 several sets of values 42 of the basic boost pressure at different gears and different temperatures and different pressures are illustrated, wherein the basic boost pressure 44 is plotted in kPa in dependence from the engine speed 46 in rpm. In comparison to FIG. 2 in FIG. 3 the sets of values 42 are transformed by means of the ideal gas law into corrected basic boost pressure sets of values 48 at same standard conditions with respect to the temperature and the pressure. The corrected sets of values 48 in FIG. 2 collapse to mainly one line with only a low difference in the values of the different corrected sets of values 48. This means that it is possible to use one set of values 48 of the basic boost pressure at standard conditions as a provided set of values 48 for calculating any estimated basic boost set of values 42 by means of a mathematical formula, which can be based on the ideal gas law.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for operating a turbo charger for a combustion engine, comprising the steps of:
    providing a set of values of a basic boost pressure for opening a waste gate for the turbo charger being derived at standard conditions comprising a standard temperature and at a standard pressure;
    measuring an ambient air temperature using a temperature sensor;
    measuring an ambient air pressure using a pressure sensor;
    calculating a density of ambient air at least using the ambient air temperature and the ambient air pressure;
    transforming at least one point of the set of values of the basic boost pressure at the standard conditions into at least one point of an estimated set of values of the basic boost pressure at ambient conditions by a correction factor based on the density; and
    using at least one estimated value of the estimated set of values of the basic boost pressure to control the waste gate of the turbo charger.

2. The method according to claim 1, wherein the set of values of the basic boost pressure at the standard conditions is given for different engine speeds.

3. The method according to claim 1, wherein the calculating of the density of ambient air is derived from a mathematically described gas law.

4. The method according to claim 3, wherein the calculating is derived from an ideal gas law.

5. The method according to claim 3, wherein the calculating is derived from van der Waals equation.

6. The method according to claim 3, wherein the calculating is derived from a Redlich-Kwong-Soave equation.

7. The method according to claim 1, wherein the calculating of the density and the transforming the set of values of the basic boost pressure is performed substantially at the same time by using correction factors.

8. A controller for controlling a turbo charger for a combustion engine, comprising:
    a memory that stores a set of values of a basic boost pressure for opening a waste gate for the turbo charger that are derived at standard conditions comprising a standard temperature and at a standard pressure;
    a data input that receives an ambient air temperature measured by a temperature sensor in operative communication with the data input and an ambient air pressure measured by a pressure sensor in operative communication with the data input,
    a calculating unit that calculates a density of ambient air using the ambient air temperature and the ambient air pressure, and transforms at least one point of the set of values of the basic boost pressure at the standard conditions into at least one point of an estimated set of values of the basic boost pressure at ambient conditions by a correction factor based on the density; and
    a control element that operates the waste gate based on at least one estimated value of the estimated set of values of the basic boost pressure.

9. The controller according to claim 8, wherein the set of values of the basic boost pressure at the standard conditions is given for different engine speeds.

10. The controller according to claim 8, wherein the calculating unit is adapted to calculate the density of ambient air derived from a mathematically described gas law.

11. The controller according to claim 10, wherein the calculating unit is derived from a Redlich-Kwong-Soave equation.

12. The controller according to claim 8, wherein the calculating unit is adapted to calculate the density of ambient air derived from an ideal gas law.

13. The controller according to claim 8, wherein the calculating unit is adapted to calculate the density of ambient air derived from van der Waals equation.

14. The controller according to claim 8, wherein the calculating unit calculates the density and transforms the set of values of the basic boost pressure substantially at the same time by using correction factors.

15. A turbo charger for a combustion engine, comprising:
    a compressor;
    a turbine connected to the compressor;
    a waste gate adapted to bypass the turbine; and
    a controller, the controller comprising:
        a memory that stores a set of values of a basic boost pressure for opening the waste gate for the turbo charger that are derived at standard conditions comprising a standard temperature and a standard pressure;
        a data input that receives an ambient air temperature measured by a temperature sensor in operative communication with the data input and an ambient air pressure measured by a pressure sensor in operative communication with the data input;
        a calculating unit that calculates a density of ambient air using the ambient air temperature and the ambient air pressure and transforms at least one point of the set of values of the basic boost pressure at the standard conditions into at least one point of an estimated set of values of the basic boost pressure at ambient conditions by a correction factor based on the density, and
        a control element that operates the waste gate based on at least one estimated value of the estimated set of values of the basic boost pressure.

* * * * *